United States Patent [19]

Amitani et al.

[11] 4,431,432
[45] Feb. 14, 1984

[54] PROCESS AND APPARATUS FOR SEPARATING A MIXED GAS SUCH AS AIR

[75] Inventors: Tatsuo Amitani; Masayoshi Kubo; Kenichi Maehara; Jun Izumi; Hiroyuki Tsutaya, all of Nagasaki, Japan

[73] Assignee: Mitsubishi Jukogyo Kabushiki Kaisha, Japan

[21] Appl. No.: 328,700

[22] Filed: Dec. 8, 1981

[30] Foreign Application Priority Data

Dec. 26, 1980 [JP] Japan .................................. 55-183819
Dec. 26, 1980 [JP] Japan .................................. 55-183821

[51] Int. Cl.$^3$ ............................................ B01D 53/04
[52] U.S. Cl. ............................................ 55/26; 55/58; 55/62; 55/68; 55/75
[58] Field of Search ................................ 55/23, 25–28, 55/33, 58, 62, 68, 75, 179, 180, 208, 389

[56] References Cited

U.S. PATENT DOCUMENTS

| | | | |
|---|---|---|---|
| 3,085,379 | 4/1963 | Kiyonaga et al. | 55/62 X |
| 3,430,418 | 3/1969 | Wagner | 55/62 X |
| 3,564,816 | 2/1971 | Batta | 55/26 |
| 3,796,022 | 3/1974 | Simonet et al. | 55/25 |
| 3,797,201 | 3/1974 | Tamura | 55/62 |
| 3,923,477 | 12/1975 | Armond et al. | 55/25 |
| 3,988,129 | 10/1976 | Fornoff et al. | 55/33 |
| 4,077,779 | 3/1978 | Sircar et al. | 55/25 |

Primary Examiner—Robert H. Spitzer
Attorney, Agent, or Firm—Wenderoth, Lind & Ponack

[57] ABSTRACT

The invention relates to a process and apparatus for separating mixed gas by adsorption in which adsorption and desorption steps are repeatedly carried out in a plurality of adsorption towers in staggered timings.

The invention is characterized in that upon commencement of the desorption step, mixed gas having a low adsorbate constituent gas concentration which is delivered in the initial part of a pressure-reducing period (a primary pressure-reducing period) in an adsorption tower which has completed adsorption, is fed into an adsorption tower which has finished pressure-reduction to scavenge and desorb the adsorbate constituent gas adsorbed by an adsorbent, whereby enhancement of a yield of an unadsorbate gas can be achieved as compared to scavenging desorption making use of a part of an unadsorbate gas delivered during an adsorption step.

9 Claims, 5 Drawing Figures

PROCESS AND APPARATUS FOR SEPARATING A MIXED GAS SUCH AS AIR

The present invention relates to improvements in a process and apparatus for separating a mixed gas such as air by adsorption.

The composition ratio of an $N_2$ gas to an $O_2$ gas in air is, as is well known, about 4:1, and the partial pressure ratio of the $N_2$ gas to the $O_2$ gas is also about 4:1. The amount of gas adsorbed by an adsorbent will vary in proportion to these partial pressures of the gases. For instance, when making an adsorbent adsorb an $O_2$ gas in air under an air pressure of 5 ata, the partial pressure of the $O_2$ gas is about 1 ata. If this air pressure of 5 ata is reduced to 1 ata, then the partial pressure of the $O_2$ gas is lowered to about 0.2 ata and most of the $O_2$ gas adsorbed by the adsorbent would be desorbed. However, in adsorption-separation apparatus of a practical size, by merely lowering the air pressure to 1 ata the $O_2$ gas adsorbed by the adsorbent will not be desorbed. The reason is because when the air pressure in the adsorption tower is lowered to 1 ata, the $O_2$ gas is desorbed from the adsorbent, hence the partial pressure of the $O_2$ gas around the adsorbent becomes high, but the $O_2$ gas partial pressure around the adsorbent is not lowered since the flow rate of the air flowing through the adsorption tower is too small, therefore the $O_2$ gas stays around the adsorbent, thus desorption of the $O_2$ gas does not proceed, and the $O_2$ gas is kept adsorbed by the adsorbent.

One known form of adsorption-separation apparatus for air which can resolve the above-mentioned problem will now be described with reference to FIG. 1. Thus, raw air is fed via a main feed pipe a to an air compressor b, which may be provided with an after-cooler, drain separator, etc. for cooling and dehumidifying the compressed air, which would normally be at a high-temperature, and if necessary, also provided with a refrigerator, or the like. Downstream of the compressor, the main feed pipe a is split into two branch pipes $c_1$ $c_2$. Cavity gas discharge pipes $d_1,e_1$ and $d_2,e_2$ are provided in juxtaposition to respective feed pipes $c_1$ and $c_2$, and valves $f_1$ to $f_6$ are provided in the above-mentioned respective pipes $c_1,d_1,e_1,c_2,d_2$ and $e_2$. A main discharge pipe section g communicates with the discharge pipes $d_1$ and $d_2$, and connects a vacuum pump h, from which a main discharge pipe section i extends. Also a main discharge pipe section j communicates with the discharge pipes $e_1$ and $e_2$. A common header pipe k is provided for respective pipes $c_1$, $d_1$ and $e_1$, whilst a common header pipe l is provided for the respective pipes $c_2$, $d_2$ and $e_2$. The header pipes connect into respective adsorption towers m and n filled with adsorbents, designated $m_1$ and $n_1$, respectively. $N_2$ gas delivery pipes o and p having respective valves g and r provided therein lead from respective adsorption towers m and n to a common delivery pipe section s which leads to a tank t to which a main delivery pipe n is connected. The adsorption towers m and n are arranged to alternately carry out an adsorption step and a desorption step. Assuming now that the description tower m has entered an adsorption step, then the valves $f_1$, g are opened and the valves $f_2$, $f_3$ are closed. Consequently, compressed raw air from the air compressor b is fed through the main feed pipe a, feed pipe $c_1$, valve $f_1$ and header pipe k to the adsorption tower m, and when the raw air passes through the adsorption tower m, the $O_2$ gas (an adsorbate constituent gas) in the raw air is adsorbed by the adsorbent $m_1$, while an $N_2$ gas (an unadsorbate constituent gas) is condensed and delivered through the delivery pipe o, valve g and pipe delivery section s to the tank t and is further extracted externally of the system through the main delivery pipe u as a product. In addition, when the adsorption tower m enters an adsorption step as described above, the other adsorption tower n enters a desorption step, and so, the valve $f_6$ is opened, while the valves $f_4$, $f_5$ and r are closed. Therefore, residual air around the adsorbent $n_1$ is discharged externally of the system through the header pipe l, valve $f_6$, discharge pipe $e_2$ and discharge pipe section j. Subsequently, the valve $f_6$ is closed and the valve $f_5$ is opened. Hence, the residual air around the adsorbent $n_1$ is sucked away and discharged externally of the system through the header pipe l, valve $f_5$, discharge pipe $d_2$, discharge pipe section g, vacuum pump h and discharge pipe section i, so that the pressure in the adsorption tower n is lowered to the partial pressure of the $O_2$ gas upon adsorption, hence the $O_2$ gas being adsorbed by the adsorbent $n_1$ is desorbed, and thus the adsorbent $n_1$ can be re-activated.

In the above-described adsorption-separation apparatus for air, although the above-referred problem can be resolved, there was a shortcoming in that pressurized gas having a high $O_2$ concentration is discharged externally of the system through the main discharge pipe sections j,i without being utilized.

Figure 2:
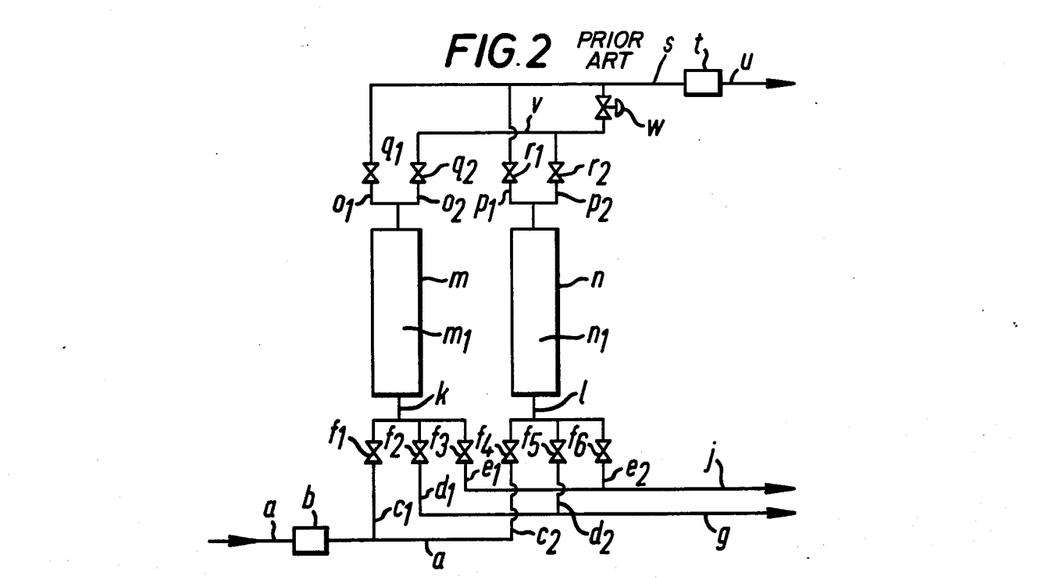

Various methods for effectively utilizing this pressurized gas have been proposed, and one example of the proposed methods is illustrated in FIG. 2. In the adsorption-separation apparatus shown in FIG. 2, a part of the $N_2$ gas which has been separated and condensed during an adsorption step, is fed through a flow rate regulating valve w into an adsorption tower which has finished a pressure-reducing step, thus by lowering the partial pressure of the residual air around an absorbent, $O_2$ gas adsorbed by the adsorbent is desorbed and the desorbed $O_2$ gas is scavenged and discharged to the discharge pipe g and, while a vacuum pump can be omitted, a part of the $N_2$ gas which has been separated and condensed with much labour and expense would be consumed in the adsorption tower during a desorption step. Moreover, since the gas discharged through the discharge pipe g is not utilized, in the case of extracting $N_2$ gas as a product there was a problem that the cost of the product is increased.

The present invention deals with the above-mentioned problem, and relates to process and apparatus for separating a mixed gas by adsorption, of the kind in which an adsorption step of feeding raw gas into an adsorption tower filled with an adsorbent to make said absorbent adsorb an adsorbate constituent gas and extracting an unadsorbate constituent gas from said adsorption tower, and a desorption step of reducing the pressure in said adsorption tower to make said adsorbent desorb the adsorbate constituent gas adsorbed thereby and recovering the adsorbate constituent gas, are repeatedly carried out in that sequence in a plurality of adsorption towers in staggered timings.

In accordance with the invention, such process and apparatus are characterised by having features as set out in the appended patent claims.

In order that the present invention will be readily understood and the various features thereof made apparent a number of embodiments will now be described, with reference to the accompanying drawings in which:

Figure 3:
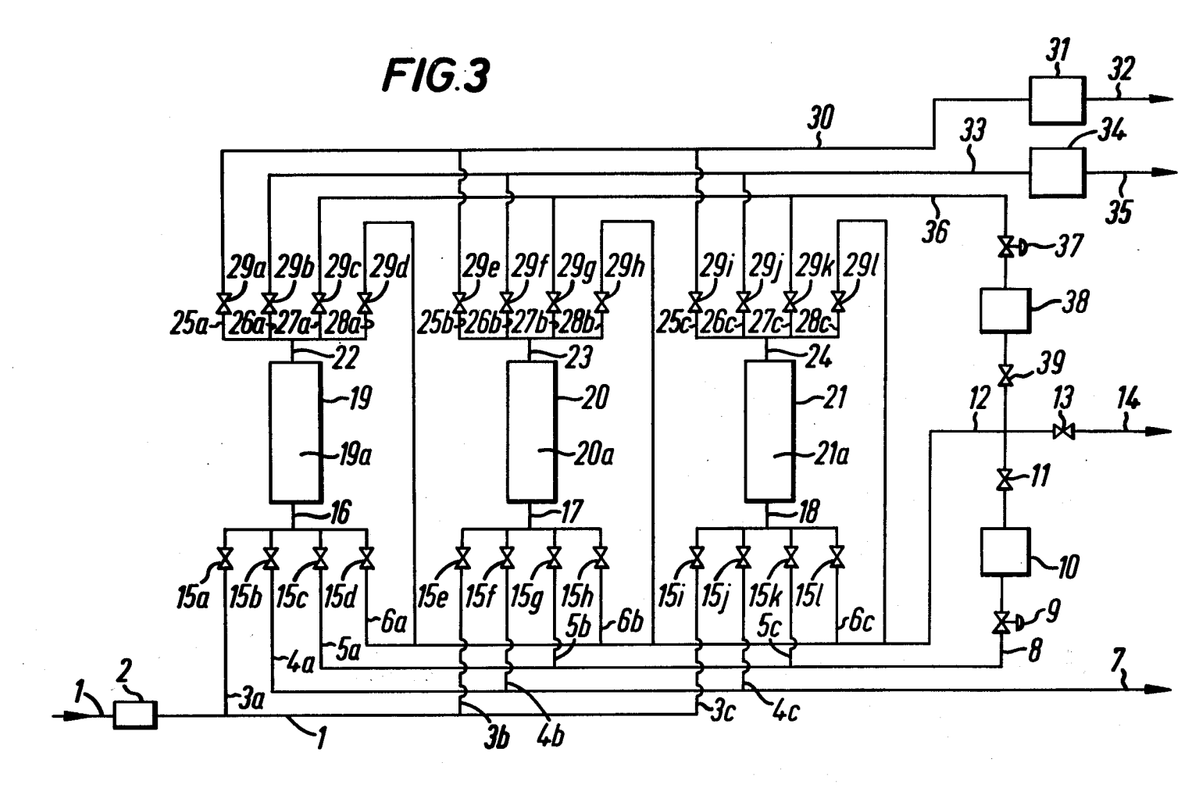
FIGS. 3 to 5 are block diagrams of various embodiments of adsorption-separation apparatus in accordance with the invention for separating air by the adsorption process.

Referring to FIG. 3 in a first embodiment of adsorption-separation apparatus for practising the process, 1 designates a main feed pipe for raw air, 2 designates an air compressor for compressing and feeding raw air, and this air compressor 2 is provided with an aftercooler, a drain separator, etc. for cooling and dehumidifying the compressed high-temperature air, and if necessary, it can also be provided with a refrigerator or the like. In addition, 3a, 3b, 3c designate raw air feed pipes branched from the above-referred main feed pipe 1. Cavity gas pipes 4a, 4b and 4c are provided in juxtaposition to the feed pipes 3a, 3b and 3c. Also cavity gas discharge pipes 5a, 5b and 5c are provided in juxtaposition to the cavity gas discharge pipes 4a, 4b and 4c, and cavity gas discharge pipes 6a, 6b and 6c are provided in juxtaposition to the cavity gas discharge pipes 5a, 5b and 5c. A common cavity gas discharge pipe 7 communicates with the above-referred discharge pipes 4a, 4b and 4c, whilst a cavity gas main discharge pipe 8 communicates with the above-referred to discharge pipes 5a, 5b and 5c. The discharge pipe 8 is provided in series with a flow rate regulating valve 9, a surge tank 10 and a valve 11, and is connected into a cavity gas main discharge pipe 12 which communicates with the above-referred to discharge pipes 6a, 6b and 6c. In addition reference 13 designates a valve in line 12 which controls the outlet at 14. Valves 15a–15l are provided in the above-referred respective pipes 3a,4a, 5a, 6a,3b,4b,5b,6b, 3c,4c,5c and 6c. A common header pipe 16 is provided for the above-mentioned respective pipes 3a, 4a, 5a and 6a, whilst a common header pipe 17 is provided for the above-mentioned respective pipes 3b,4b,5b and 6b, and a common header pipe 18 is provided for the above-mentioned respective pipes 3c,4c, 5c and 6c. Three adsorption towers 19,20 and 21 are provided and each is filled with an adsorbent designated 19a, 20a, 21a respectively. $N_2$ gas delivery pipes 25a, 25b and 25c are provided and juxtaposed with respective $N_2$ gas delivery pipes 26a, 26b and 26c, and with respective cavity discharge pipes 27a, 27b and 27c. Also respective cavity gas discharge pipes 28a, 28b and 28c are provided in juxtaposition with the discharge pipes 27a, 27b and 27c, which discharge pipes communicate with the above-described cavity gas main discharge pipe 12. In addition a header pipe 22 is provided for the above pipes 25a, 26a, 27a and 28a, whilst header pipe 23 is provided for the pipes 25b, 26b 27b and 28b and a header pipe 24 is provided for the pipes 25c, 26c, 27c and 28c. Valves 29a–29l are provided in the above-referred to respective pipes 25a, 26a, 27a, 28a, 25b, 26b, 27b, 28b, 25c, 26c, 27c and 28c. A common $N_2$ gas delivery pipe 30 communicates with the above-mentioned delivery pipes 25a, 25b, and 25c and is connected to a surge tank 31, to which an $N_2$ gas main delivery pipe 32 is connected. A common $N_2$ gas delivery pipe 33 communicates with the above-mentioned delivery pipes 26a, 26b, and 26c which is also connected to a surge tank 34, to which an $N_2$ gas main delivery pipe 35 is connected.

The common cavity gas discharge pipe 36 communicates with discharge pipes 27a, 27b and 27c and is provided with a flow rate control valve 37, surge tank 38 and valve 39, in series before joining the pipe 12. It is to be noted that, while an automatic control device for operating the respective valves would be provided for the apparatus, it is omitted from the block diagram. In addition, four or more adsorption towers could be provided.

In operation of the above-described adsorption-separation apparatus, the three adsorption towers 19, 20 and 21 carry out:

I a high-pressure adsorption step,

II primary and secondary pressure-reducing steps and a desorption step, and

III a low-pressure pressure-raising step, a low-pressure adsorption step and a high-pressure pressure-raising step, repeatedly in the sequence of I–II–III in staggered timings. Assuming now that the adsorption tower 19 has entered the step I above, then only the valves 15a,29a are opened. Consequently, raw air compressed by the air compressor 2 is fed through the main feed pipe 1, feed pipe 3a, valve 15a and header pipe 16 to the adsorption tower 19, and when it passes through the adsorption tower 19, the $O_2$ gas (an adsorbate constituent gas) in the raw air is adsorbed by the adsorbent 19a, while the $N_2$ gas (an unadsorbate constituent gas) is condensed and delivered through the header pipe 22, delivery pipe 25a, valve 29a and common delivery pipe 30 to the surge tank 31, and is further extracted externally of the system through the main delivery pipe 32 as a product. When the adsorption tower 19 enters the step I, the adsorption tower 21 enters the step II, so that the valves 15l, 29l and 39 are opened and the valve 15i, 15j, 15k, 29i, 29j 29k, 11 and 13 are closed, and thus the primary pressure-reducing step is commenced in the absorption tower 21 which has finished the step I. In this step, a cavity gas at a relatively high pressure around the adsorbent 21a is passed through the header pipe 18, valve 15l and discharge pipe 6c to the main discharge pipe 12, and also passed through the header pipe 24, discharge pipe 28c and valve 29l to the main discharge pipe 12, and further it is passed from the main discharge pipe 12 via the valve 39 to the tank 38. When the internal pressures of the adsorption tower 21 and the tank 38 have become nearly equal to each other, the valve 39 is closed and the valve 11 is opened to enter the secondary pressure reducing step. In this step, the cavity gas in the main discharge pipe 12 is fed to the tank, and when the internal pressures of the tank 10 and the tower 21 have become equal to each other the valve 11 is closed whilst the valve 13 is opened to begin the third pressure reducing step. In this step residual gas is discharged externally from the system. When the internal pressure of the adsorption tower 21 has become nearly equal to the partial pressure of the $O_2$ gas in the raw air being fed to the absorption tower 19, the valve 13 is closed and then a series of pressure-reducing steps has been terminated. Subsequently the adsorption tower 21 enters the desorption step by opening the valves 15j and 29k.

As a matter of course at the start of, or during, the third pressure-reducing step once the partial pressure of the $O_2$ gas has been attained the subsequent pressure reducing step is immediately terminated. When the valves 15j and 29k at the tower 21 are opened, cavity gas having a low $O_2$ concentration, which is stored in the tank 38, begins to flow to the main discharge pipe 7 via the valves 37, 29k and 15j and pipes 36, 27c, 24, 18 and 4c, thus causing a reduction of the partial pressure of the $O_2$ gas in the tower 21 and hence the $O_2$ gas adsorbed by the adsorbent 21a is desorbed. It is then scavenged and recovered at the common discharge pipe 7. As soon as the $O_2$ gas concentration begins to fall, during the above described desorption step, the valves 15j and 29k are closed to end the step. It is to be noted that since some of the cavity gas stored in the tank 38 is consumed during the desorption step and supplemented during the primary pressure reducing step, the tank 38 must have adequate volume for conducting such operations. In addition, where a gas with a high $O_2$ concentration is recovered as a product at the common discharge pipe 7, depending upon the degree of concentration, a whole, or part of the cavity gas delivered during the third pressure reducing step could be recovered as a product by closing valves 15l, 29l and 13 and by opening valve 15j at the start of, or during, the third pressure reducing step.

When the adsorption tower 19 enters the step I, the adsorption tower 20 enters the step III and only the valve 29f is opened. Therefore, low-pressure $N_2$ gas in the tank 34 is passed through the main delivery pipe 33, valve 29f, delivery pipe 26b and header pipe 23 into the adsorption tower 20 which has finished the desorption step, and then a low-pressure pressure-raising step is commenced. When the internal pressures of the tank 34 and the adsorption tower 20 have become nearly equal to each other, the valve 15g is opened to enter the low-pressure adsorption step. In this step, the cavity gas stored in the tank 10 during the secondary pressure-reducing step is passed through the flow rate regulating valve 9, main discharge pipe 8, discharge pipe 5b, valve 15g and header pipe 17 into the adsorption tower 20, hence $O_2$ gas in that gas is adsorbed by the adsorbent 20a, the condensed and separated $N_2$ gas is delivered through the header pipe 23, delivery pipe 26b, valve 29f and main delivery pipe 33 to the tank 34, and while watching and determining the moment when the concentration of the $O_2$ gas in that gas begins to rise, the valves 15g and 29f are closed to terminate the low-pressure adsorption step. It is to be noted that the low-pressure pressure-raising step and the low-pressure adsorption step could be combined into one step by simultaneously opening the valves 15g and 29f. Also, depending upon the $O_2$ gas concentration in the low-pressure $N_2$ gas delivered from the tank 34, a modification could be made such that the valve 15g is opened, instead of opening the valve 29f, to carry out the low-pressure pressure-raising step by feeding the cavity gas into the adsorption tower 20. When the low-pressure adsorption step has been finished in the adsorption tower 20, the valve 29e is opened, thereby the high-pressure $N_2$ gas in the tank 31 is passed through the common delivery pipe 30, valve 29e, delivery pipe 25b and header pipe 23 into the adsorption tower 20 to carry out the high-pressure pressure-raising step, and when the internal pressures of the tank 31 and the adsorption tower 20 have become nearly equal to each other, the valve 29e is closed to finish the high-pressure pressure-raising step. It is to be noted that the valve 29e could be kept open in preparation for the subsequent high-pressure adsorption step. Since the cavity gas stored in the tank 10 is consumed during the low-pressure adsorption step and the consumed cavity gas is supplemented during the secondary pressure-reducing step, it is necessary for the tank 10 to have adequate volume for conducting such operations. In addition, depending upon the $O_2$ gas concentration in the high-pressure $N_2$ gas fed from the tank 31, a modification could be made such that the valve 15e is opened instead of opening the valve 29e during the high-pressure pressure-raising step to feed the raw air into the adsorption tower 20 and thereby the high-pressure pressure-raising step is carried out. Moreover, further modification could be made such that, after termination of the low-pressure pressure-raising step, the adsorption tower 20 enters the high-pressure adsorption step and the valves 15e 29e are simultaneously opened to carry out the high-pressure pressure-raising step and the high-pressure adsorptive step at the same time (the above-mentioned being a first preferred embodiment).

In the above-described first preferred embodiment, during the primary and secondary pressure-reducing steps, the cavity gas was delivered from the both sides of the adsorption tower 21 by opening the valves 15l and 29l. However, modification could be made so that during the primary pressure-reducing step the valves 15l and 29l are opened but during the other pressure-reducing steps, or at least during the secondary pressure-reducing step, the cavity gas is delivered from one side of the adsorption tower 21 by opening only the valve 15l. With respect to all other points the operation is identical to the first preferred embodiment (the above-mentioned being a second preferred embodiment).

Figure 1:
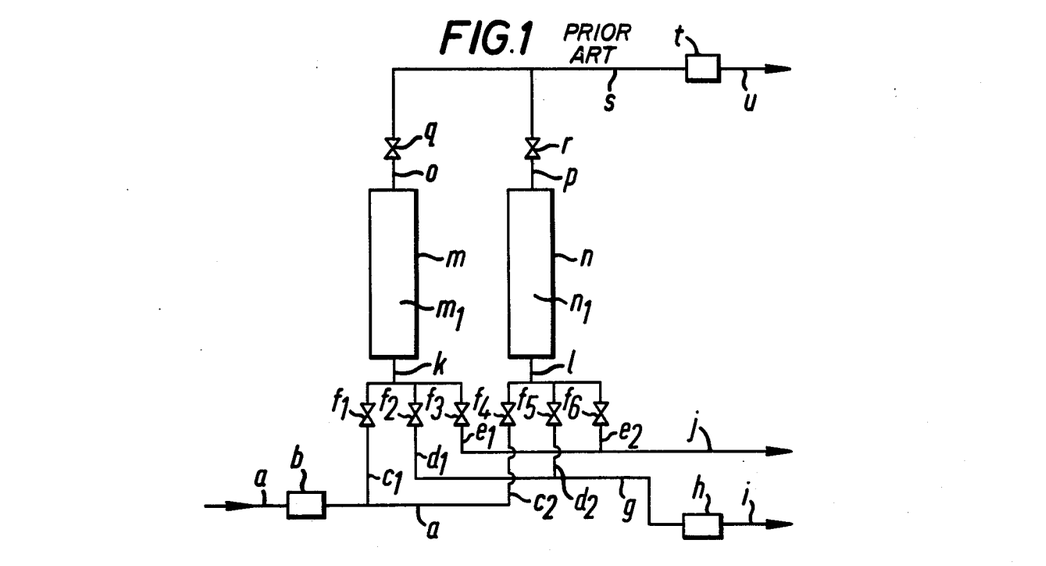
FIGS. 1 and 2 are block diagrams of two forms of conventional adsorption-separation apparatus for carrying out the process for separating air by adsorption.

When the process according to the present invention and the processes in the prior art were compared to each other by filling each one of the adsorption towers in FIGS. 1 and 2 and the adsorption towers in FIG. 3 with 10 kg of adsorbent (Fe-K-Na-A), the rsults indicated in Table 1 were obtained. It is to be noted that in this case since Fe-K-Na-A is used as an adsorbent, the adsorbate constituent gas is oxygen ($O_2$) and the unadsorbate constituent gas is nitrogen ($N_2$). In the test of the second preferred embodiment, the valves 29d, 29h and 29l were kept closed during the second and third pressure-reducing steps.

TABLE 1

| Test Apparatus & Test Process | | | | Process According to the Present Invention FIG. 3 | | Process in the Prior Art | |
|---|---|---|---|---|---|---|---|
| | | | | 1st Embodiment | 2nd Embodiment | FIG. 1 Evacuating Desorption | FIG. 2 Scavenging Desorption |
| Feed Air | Pressure | | ata | 6 | 6 | 6 | 6 |
| | Flow Rate | | Nm³/H | 10.0 | 10.0 | 10.0 | 10.0 |
| | Temperature | | °C. | 25 | 25 | 25 | 25 |
| Delivered $N_2$ | Pressure | High-Pressure | ata | 6 | 6 | 6 | 6 |
| | | Low-Pressure | ata | 2.5 | 2.2 | — | — |
| | Flow Rate | High-Pressure | Nm³/H | 4.8 | 4.3 | 4.9 | 4.5 |
| | | Low- | Nm³/H | 1.5 | 1.7 | — | — |

TABLE 1-continued

|  |  |  | Process According to the Present Invention FIG. 3 | | Process in the Prior Art | |
|---|---|---|---|---|---|---|
|  |  |  |  |  | FIG. 1 Evacuating | FIG. 2 Scavenging |
| Test Apparatus & Test Process | | | 1st Embodiment | 2nd Embodiment | Desorption | Desorption |
|  |  | Pressure Total Nm³/H | 6.3 | 6.0 | 4.9 | 4.5 |
|  | O₂ Concentration | vol. % | 1 or less | 1 or less | 1 or less | 1 or less |
|  | Pressure | ata | 1.2 | 1.2 | 1.2 → 0.2 | 1.2 |
| Delivered O₂ | Flow Rate | Nm³/H | 2.1 | 2.32 | 1.4 | 1.7 |
|  | O₂ Concentration | vol. % | 74 | 57 | 70 | 55 |
|  | Pure O₂ Flow Rate | Nm³/H | 1.55 | 1.32 | 0.98 | 0.94 |

I. Despite the fact that only the compressor 2 was used and not a vacuum pump and hence the power consumption was small, the delivery flow rates of the N₂ gas and the O₂ gas were increased as compared to the prior art processes, so the manufacturing cost was also reduced.

II. With regard to the delivery of the cavity gas from both sides of the adsorption tower, if it is carried on throughout a series of pressure-reducing steps, greater delivery flow rates of N₂ gas and O₂ gas could be obtained than when it is carried on only during the primary pressure-reducing step, since this would reduce the manufacturing cost, a better result could be obtained. This means that in the case of delivering the cavity gas from only one side (the side for feeding raw air) of the adsorption tower during the third pressure-reducing step it takes a value intermediate between the above-mentioned results.

III. In the process according to the present invention, the delivery rate of the N₂ gas is large as described above, and this implies that the O₂ gas concentration in the gas discharged through the discharge pipes 7 and 14 is high. Especially, in the case of the first preferred embodiment, the O₂ gas concentration amounts to as high as 74%, and it was effective in reducing the manufacturing cost of O₂ gas.

Figure 4:
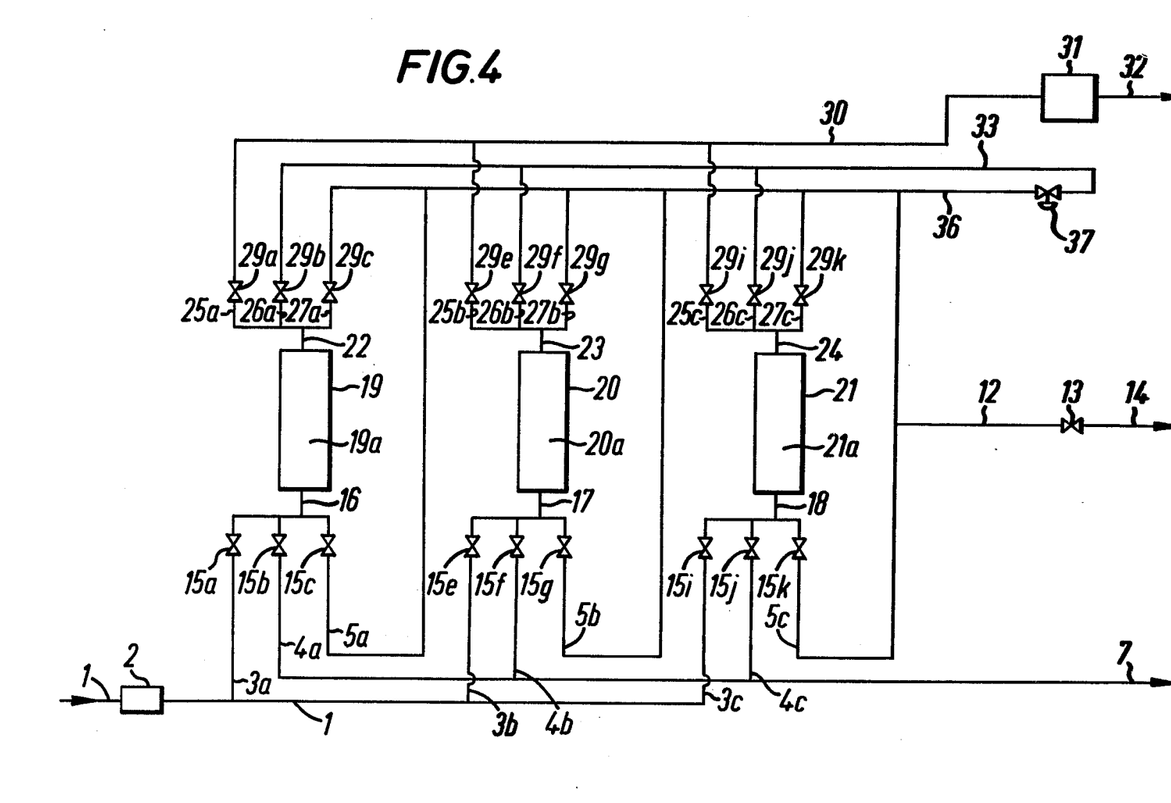

The apparatus in FIG. 4 is a simplified form of that shown in FIG. 3 in that the number of delivery and discharge pipes at either end of the absorption towers is reduced from 4 to 3. Also the pipe 8 together with its valves 9 and 11 and surge tank 10 is eliminated completely as are the surge tank 38 and valve 39.

The pipes 33 and 36 are joined together so as to eliminate the surge tank 34 and outlet 35 and the flow rate valve 37 is now located at the junction of pipes 33 and 36.

The operation of the apparatus shown in FIG. 4 is similar to that of FIG. 3 but in this case the three absorption towers 19, 20 and 21 carry out:

I an adsorption step,
II a pressure-reducing step and
III a desorption step and a pressure raising step, repeatedly in the sequence of I-II-III in staggered timings. Assuming now that the adsorption tower 19 has entered the step I above, then the valves 15a and 29a are opened, and the valves 15b, 15c, 29b and 29c are closed. Consequently, raw air compressed by the air compressor 2 is fed through the main feed pipe 1, feed pipe 3a, valve 15a and header pipe 16 to the adsorption tower 19 and, when it passes through the adsorption tower 19, the O₂ gas (an adsorbate constituent gas) in the raw air is adsorbed by the adsorbent 19a, while the N₂ gas (an unadsorbate constituent gas) is condensed and delivered through the header pipe 22, delivery pipe 25a, valve 29a and common delivery pipe 30 to the surge tank 31, and is further extracted externally of the system through the main delivery pipe 32 as a product. When the adsorption tower 19 enters the step (I), the adsorption tower 21 enters the step (II). At this moment a mass transfer zone of O₂ gas has shifted to the proximity of the outlet end (the side of the header pipe 24), and the nearer to the outlet, the more N₂ gas exists. The inside of the adsorption tower 21 is held at a pressure equal to the adsorption pressure. Starting from this condition, if only the valve 29k is opened, then initially an N₂ gas is discharged, subsequently air remaining at the inlet end (the side of the header pipe 18) is discharged and, owing to this flow of air, the partial pressure of the O₂ gas is lowered and the O₂ gas is desorbed, so that a gas having a relatively high O₂ concentration would be delivered. Whereas, if only the valve 15k is opened, then initially air is discharged, but subsequently N₂ gas is discharged and, owing to this flow of N₂ gas, the partial pressure of the O₂ gas is lowered and the O₂ gas is desorbed, so that in this case there is a risk that a gas having a relatively high O₂ concentration would be delivered. Therefore, both the valves 15k, 29k are opened to discharge a residual mixed gas (cavity gas) within the adsorption tower 21 through the header pipe 18, valve 15k and discharge pipe 5c to the discharge pipe 36 and also through the header pipe 24, valve 29k and discharge pipe 27c to the discharge pipe 36, and thus the primary pressure-reducing step is carried out. At this instant, the pressure of the mixed gas within the adsorption tower 21 is lowered to a predetermined pressure, hence the O₂ gas is desorbed from the adsorbent 21a and the partial pressure of the O₂ gas around the adsorbent 21a becomes high but, because the flow rate of the mixed gas flowing through the adsorption tower 21 is small, the partial pressure of the O₂ gas around the adsorbent 21a is not lowered, the O₂ gas stays around the adsorbent 21a, hence desorption of the O₂ gas does not proceed and the O₂ gas is kept adsorbed by the adsorbent 21a. In addition, as will be described later, when the desorption step has been finished in the adsorption tower 20, the valve 29k is closed at the adsorption tower 21. Also, the valve 13 is opened to enter the secondary pressure-reducing step, and surplus mixed gas remaining within the adsorption tower 21 is discharged externally of the system through the header pipe 18, valve 15k, discharge pipe 5c, valve 13 and discharge pipe 14. However, the O₂ concentration of the gas delivered during this secondary pressure-reducing step is initially low but rises as the pressure-reducing step proceeds and, therefore, when extracting the O₂ gas as a product, it is possible to close the valves 15k and 13 and open the valve 15j at the start of, or during, the secondary pressure-reducing step for recovering the O₂ gas externally of the system through the common discharge pipe 7. When the pressure in the adsorption tower 21 has been lowered to a predetermined value, the valves 29k and 13 are opened, and the secondary pressure-reducing step is terminated. Furthermore, when the adsorption tower 19 has entered the adsorption step (I), the adsorption tower 20 enters the desorption and pressure-raising step (III). At first the valves 15f and 29f are opened and the valves 15e, 15g, 29e and 29g are closed. Consequently, the residual mixed gas in the adsorption tower 21 which was discharged to the discharge pipe 36, is passed through the flow rate control valve 37, feed pipes 33 and 26b, valve 29f and header pipe 23 to the adsorption tower 20 and, while the gas within the adsorption tower 20 is scavenged, the $O_2$ gas adsorbed by the adsorbent 20a is desorbed. Also, a gas having a high $O_2$ concentration desorbed from the adsorbent 20a is discharged and recovered through the header pipe 17, valve 15f, discharge pipe 4b and common discharge pipe 7. Subsequently, the valves 15f and 29f are closed and the valve 29e is opened. Therefore, $N_2$ gas is purged from the tank 31 through the delivery main pipe 30, delivery pipe 25b, valve 29 and header pipe 23 into the adsorption tower 20, so that the pressure in the adsorption tower 20 is raised to a predetermined pressure. When the required pressure has been attained, the valve 29e is closed and the desorption and pressure-raising step is terminated. However, depending upon the proportion of the relevant time intervals to carry out the above-mentioned respective steps (I), (II) and (III), the pressure-raising step could be carried out at the beginning of the adsorption step, by opening the valves 15a and 29a when the adsorption tower 19 has entered the adsorption step with the pressure-raising step omitted and simultaneously introducing raw air and $N_2$ gas (the above-mentioned being a third preferred embodiment). In addition, while the mixed gas is discharged from one side of the adsorption tower 21 by keeping the valve 15k open when the adsorption tower 21 has entered the secondary pressure-reducing step in the above-described third preferred embodiment, the mixed gas could be discharged from the both sides of the adsorption tower 21 by keeping both the valves 15k and 29k open and, on the other hand, opening the valve 13 (a fourth preferred embodiment).

The process for separating a mixed gas using the adsorption-separation apparatus shown in FIG. 5, in which the surge tank 38 is restored to the apparatus, in contrast to the process using the apparatus shown in FIG. 4 is as follows. A mixed gas discharged in the primary pressure-reducing step for desorption is fed through the flow rate control valve 37 directly into another adsorption tower which is carrying out a desorption step, and these adsorption towers and an adsorption tower which is carrying out an adsorption step are synchronously operated; in the present apparatus a mixed gas discharged during a primary pressure-reducing step is temporarily stored in the tank 38 and subsequently it can be fed from the tank 38 into another adsorption tower which has finished a secondary pressure-reducing step and, if such provision is made, then it is not always necessary to synchronize a primary pressure-reducing step with a desorption step (the above-mentioned being a fifth preferred embodiment). Moreover, as already mentioned, if the secondary pressure-reducing step is omitted, the number of the adsorption towers can be reduced to two. All other operations of the above-described fifth preferred embodiment are identical to the third preferred embodiment. Furthermore, in the above-described fifth preferred embodiment, it is also possible to extract the mixed gas in the adsorption tower from the both sides of the adsorption tower and store it in the tank 38 during the secondary pressure-reducing step (a sixth preferred embodiment).

When the process in the prior art and the process according to the present invention were compared to each other by filling each one of the adsorption towers in FIG. 1 and the adsorption towers in FIGS. 2 and 3 with 10 kg of adsorbent (Fe-K-Na-A) and 7.5 kg of adsorbent (Fe-Na-A), the results indicated in Table-1 were obtained.

TABLE 2

Figure 5:
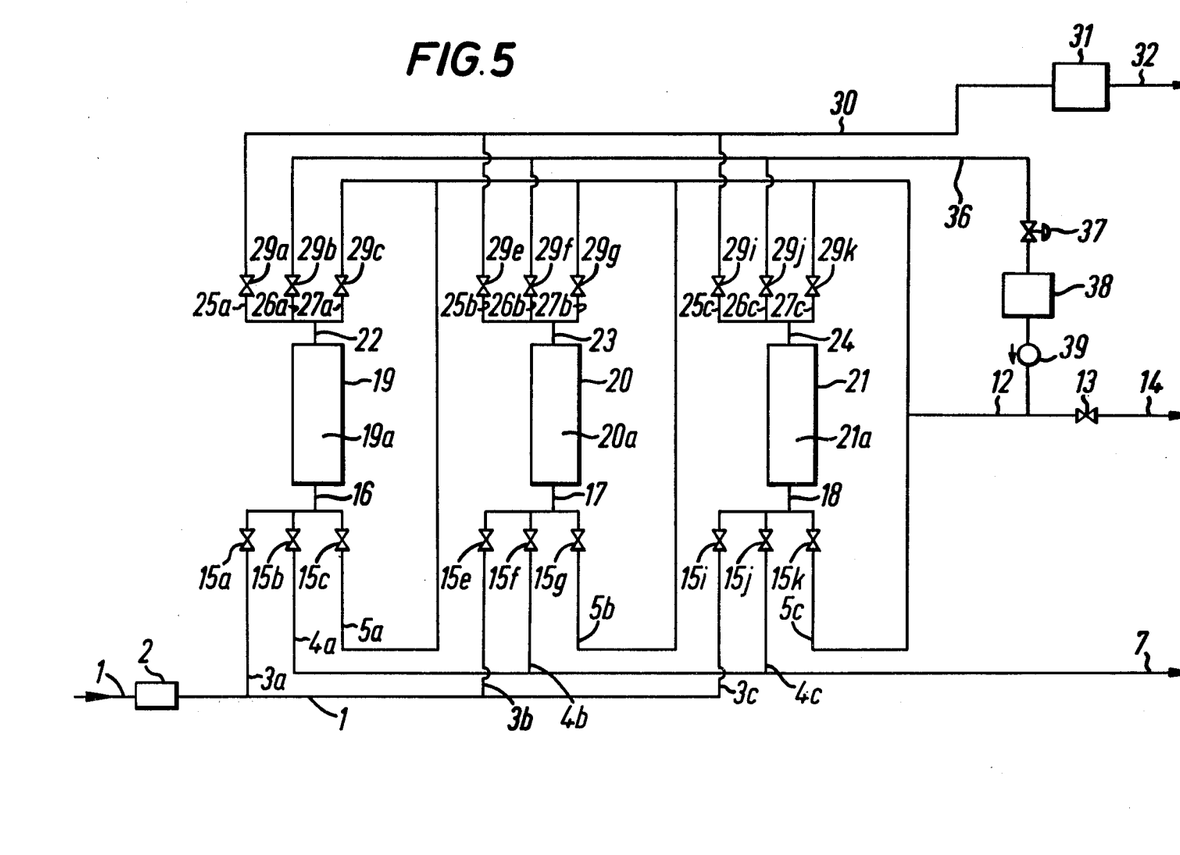

| | | | Filled Adsorbent | | | | | | |
|---|---|---|---|---|---|---|---|---|---|
| | | | Fe—K—Na—A | | | | Fe—Na—A | | |
| | | | | | Process of This Invention | | | Process of This Invention | |
| | | | Process in the Prior Art | | FIG. 4 Process | FIG. 4 Process | Process in the Prior Art | | FIG. 3 Process | FIG. 5 Process |
| Test Apparatus & Test Process | | | FIG. 1 Evacuating Desorption | FIG. 2 Scavenging Desorption | of 3rd Embodiment | of 4th Embodiment | FIG. 2 Evacuating Desorption | FIG. 1 Scavenging Desorption | of 5th Embodiment | of 6th Embodiment |
| Adsorption Tower Feed Air | Pressure | ata | 6 | 6 | 6 | 6 | 6 | 6 | 6 | 6 |
| | Flow Rate | $Nm^3/H$ | 10 | 10 | 10 | 10 | 10 | 10 | 10 | 10 |
| | Temperature | °C. | 25 | 25 | 25 | 25 | 0 | 0 | 0 | 0 |
| Delivered $N_2$ gas | Pressure | ata | 6 | 6 | 6 | 6 | 6 | 6 | 6 | 6 |
| | Flow Rate | $Nm^3/H$ | 4.9 | 4.5 | 5.2 | 5.0 | 5.6 | 5.0 | 5.6 | 5.1 |
| | $O_2$ Concentration | vol. % | 1 or less | 1 or less | 1 or less | 1 or less | 1 or less | 1 or less | 1 or less | 1 or less |
| Delivered $O_2$ gas | Pressure | ata | 1.2 → 0.2 | 1.2 | 1.2 | 1.2 | 1.2 → 0.2 | 1.2 | 1.2 | 1.2 |
| | Flow Rate | $Nm^3/H$ | 1.4 | 1.7 | 1.7 | 1.8 | 1.4 | 1.5 | 1.4 | 1.7 |
| | $O_2$ Concentration | vol. % | 70 | 55 | 57 | 74 | 79 | 63 | 65 | 84 |
| | Equivalent Pure $O_2$ Flow Rate | $Nm^3/H$ | 0.98 | 0.94 | 0.94 | 1.33 | 1.23 | 0.94 | 0.96 | 1.43 |

(I) As will be apparent from Table 2, in the fifth preferred embodiment, despite the fact that a vacuum pump was not used, the delivery flow rate of the $N_2$ gas is equal to, or larger, than that in the prior art processes. In addition, though not indicated in Table-1, in the case of the third preferred embodiment, a similar effect can also be expected. This implies that at least the cost of the power for operating a vacuum pump can be saved.

(II) In the sixth preferred embodiment, both the delivery flow rate of the $O_2$ gas and the $O_2$ gas concentration are improved as compared to the processes in the prior art. Moreover, the flow rate of pure $O_2$ in the delivered $O_2$ gas is greatly increased, so the cost of the power per $Nm^3$ of pure $O_2$ is greatly reduced assisted by the fact that a vacuum pump is unnecessary. This is also expected in the fourth preferred embodiment.

(III) As seen from the above, in the case of extracting an $N_2$ gas as a product, the third and fifth preferred embodiments are most suitable and in the case of extracting an $O_2$ gas as a product the second and fourth embodiments are most suitable.

(IV) The adsorption and desorption steps require to be carried out over a particular time period, whereas with regard to the pressure reducing step, the faster it is carried out, without damaging the adsorbent, the less the desorption of the $O_2$ gas adsorbed by the adsorbent. However, with respect to this point, the fifth and sixth preferred embodiments are better than the third and second preferred embodiments. Furthermore, in the fifth and sixth preferred embodiments, it is not always necessary to synchronize the primary pressure-reducing step with the desorption step, so there is greater freedom in the arrangement of the steps and, depending upon the time taken for the respective steps, the number of the adsorption towers can be reduced to two.

We claim:

1. A process for separating air into oxygen and nitrogen by adsorption, which comprises an adsorption step of feeding air into an adsorption tower filled with an oxygen adsorbent to make said adsorbent adsorb oxygen gas and extracting an unadsorbate gas mainly comprising nitrogen from said adsorption tower, and a desorption step of reducing the pressure in said adsorption tower to make said adsorbent desorbe the oxygen adsorbed thereby and recovering the oxygen gas, said steps being repeatedly carried out in a plurality of adsorption towers with staggered timing; and wherein upon commencement of the desorption step, mixed gas having a low oxygen concentration is delivered in the initial part of a pressure-reducing period in an adsorption tower which has completed adsorption, is fed into an adsorption tower which has completed pressure-reduction to scavenge and desorb the oxygen gas adsorbed by an adsorbent, whereby enhancement of the yield of the unadsorbate gas can be achieved as compared to scavenging desorption making use of a part of an unadsorbate gas delivered during an adsorption step and wherein a void space gas existing amid the adsorbent of the adsorbent bed at the completion of the adsorption step is released from the two ends of said bed until the pressure of said gas reaches a predetermined pressure at the start of the desorption step, whereby the oxygen concentration of the desorbed gas that is to be recovered in the subsequent desorption step of oxygen gas, is raised.

2. The process as claimed in claim 1, wherein the scavenging desorption pressure is close to the partial pressure of the oxygen in the air.

3. The process as claimed in claim 1 or 2, wherein mixed gas delivered during a secondary pressure-reducing period subsequent to primary pressure-reduction is fed into an adsorption tower, in which a pressure has been raised to an intermediate pressure between the scavenging desorption pressure and the pressure during high-pressure adsorption that is carried out by feeding said mixed gas and/or an unadsorbate gas delivered during a low-pressure adsorption step carried out by feeding said mixed gas into an adsorption tower which has completed scavenging desorption and also by feeding high-pressure air thereto, to achieve low-pressure adsorption and deliver an unadsorbate gas, whereby yields of both the oxygen and unadsorbate constituent gases can be enhanced.

4. The process as claimed in claim 1 wherein a mixed gas delivered during the primary pressure-reduction and/or secondary pressure-reduction is once stored in a tank, whereby synchronization of these pressure-reducing steps with a scavenging desorption step and/or a low-pressure adsorption step is made unnecessary.

5. The process as claimed in claim 1 wherein a part or whole of a mixed gas that is rich in oxygen and which is delivered in the latter period of the pressure-reducing step is delivered externally of the system jointly with a gas delivered during a scavenging desorption step within a permissible range of oxygen and that is delivered externally of the system, whereby the yield of oxygen can be enhanced.

6. The process as claimed in claim 5, wherein in latter period of the pressure-reducing step, the gas within the adsorption tower is delivered from the side for feeding a raw gas, whereby the yield of oxygen can be enhanced.

7. The process as claimed in claim 1 wherein during the pressure-reducing steps other than the primary pressure reducing step, the gas within the adsorption twoer is delivered from the both sides of the tower, whereby the oxygen concentration in the gas delivered during the scavenging desorption can be raised and yields of both the oxygen and unadsorbate constituent gases can be enhanced.

8. The process as claimed in claim 1, wherein a pressure in an adsorption tower that is to enter an adsorption step is raised to the high-pressure adsorption pressure by means of a raw gas, or a part of gas delivered upon high-pressure adsorption, in which latter case the purity of said gas is raised but the yield thereof is lowered.

9. The process as claimed in claim 1, wherein the oxygen adsorbent in the adsorption towers is prepared by adding at least iron having a valency of two or more to an industrially pure 4A-type zeolite.

* * * * *